United States Patent
Li et al.

(10) Patent No.: US 12,302,272 B2
(45) Date of Patent: May 13, 2025

(54) METHODS AND APPARATUS OF TIMING HANDLING FOR INTEGRATION OF TERRESTRIAL NETWORK AND NON-TERRESTRIAL NETWORK COMMUNICATIONS

(71) Applicant: MediaTek Singapore Pte. Ltd., Singapore (SG)

(72) Inventors: Dan Li, Shanghai (CN); Shiang-Jiun Lin, Hsinchu (TW); I-Kang Fu, Hsinchu (TW); Xuancheng Zhu, Shanghai (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 376 days.

(21) Appl. No.: 17/794,348

(22) PCT Filed: Jan. 22, 2021

(86) PCT No.: PCT/CN2021/073287
§ 371 (c)(1),
(2) Date: Jul. 21, 2022

(87) PCT Pub. No.: WO2021/147998
PCT Pub. Date: Jul. 29, 2021

(65) Prior Publication Data
US 2023/0049998 A1    Feb. 16, 2023

(30) Foreign Application Priority Data
Jan. 23, 2020  (WO) ................ PCT/CN2020/073953

(51) Int. Cl.
*H04W 56/00*    (2009.01)
*H04W 72/1268*  (2023.01)
(Continued)

(52) U.S. Cl.
CPC ... *H04W 56/0045* (2013.01); *H04W 72/1268* (2013.01); *H04W 84/06* (2013.01); *H04W 88/06* (2013.01)

(58) Field of Classification Search
CPC ......... H04W 56/0045; H04W 72/1268; H04W 84/06; H04W 88/06; H04W 74/0833
See application file for complete search history.

(56) References Cited

U.S. PATENT DOCUMENTS

2013/0286953 A1   10/2013  Ye et al.
2020/0383147 A1*  12/2020  Yoon .................. H04L 27/2607
2021/0175964 A1*   6/2021  Kusashima ....... H04W 56/0005

FOREIGN PATENT DOCUMENTS

CN        111919503 A     11/2020
WO    WO 2019035949 A1    2/2019
(Continued)

OTHER PUBLICATIONS

European Patent Office, Extended European Search Report in European Patent Application No. 21743635.1, Nov. 24, 2023.
(Continued)

*Primary Examiner* — Fred A Casca
(74) *Attorney, Agent, or Firm* — Andy M. Han; Han IP PLLC

(57) ABSTRACT

The present disclosure proposes schemes, techniques, designs and methods pertaining to timing handling for integration of terrestrial network (TN) and non-terrestrial network (NTN) communications. Communications between a user equipment (UE) and a TN node and communications between the UE and an NTN node are established. The UE compensates for a first propagation delay in the communications between the UE and the NTN node, and the UE is able to obtain a second propagation delay between the UE and the NTN node.

18 Claims, 9 Drawing Sheets

(51) Int. Cl.
   *H04W 84/06* (2009.01)
   *H04W 88/06* (2009.01)

(56) References Cited

FOREIGN PATENT DOCUMENTS

| WO | WO 2019246276 A1 | 12/2019 |
|---|---|---|
| WO | WO 2020173415 A1 | 9/2020 |
| WO | WO 2020205395 A2 | 10/2020 |

OTHER PUBLICATIONS

Thales et al.: "On Doppler shift compensation and Timing Advance in NTN", 3GPP TSG RAN WG1 Meeting #97, R1-1907390, Reno, USA, May 13-17, 2019.
Thales: "Timng alignment in NTN", 3GPP TSG RAN WG1 Meeting #96, R1-1903148, Athens, Greece, Feb. 25-Mar. 1, 2019.
Nokia et al.: "Doppler Compensation, Uplink Timing Advance and Random Access in NTN", 3GPP TSG RAN WG1 #99, R1-1913017, Reno, USA, Nov. 18-22, 2019.
Sony; "Discussion on Timing adjustment in NTN"; 3GPP TSG RAN WG1 #98bis; R1-1910747; Chongqing, China; Oct. 14-20, 2019.
Sony; "Discussion on TA compensation and adjustment in NTN"; 3GPP TSG RAN WG1 #99; R1-1912348; Reno, NV. USA; Nov. 18-22, 2019.
LG Electronics Inc.; "Dual connectivity use cases in NTN"; 3GPP TSG-RAN WG2 Meeting #107bis; R2-1911347; Chongqing, China; Oct. 14-18, 2019.
CATT; "Discussion on Random Access Procedure for NTN"; 3GPP TSG RAN WG2 Meeting #107bis; R2-1912159; Chongqing, China; Oct. 14-18, 2019.
China National Intellectual Property Administration, First Office Action in China Patent Application No. 202180010851.2, Jul. 14, 2023.

\* cited by examiner

METHODS AND APPARATUS OF TIMING HANDLING FOR INTEGRATION OF TERRESTRIAL NETWORK AND NON-TERRESTRIAL NETWORK COMMUNICATIONS

CROSS REFERENCE TO RELATED PATENT APPLICATION(S)

The present disclosure is part of U.S. National Stage filing of International Patent Application No. PCT/CN2021/073287, filed 22 Jan. 2021, which claims the priority benefit of International Patent Application No. PCT/CN2020/073953, filed 23 Jan. 2020, the contents of which being herein incorporated by reference in their entirety.

TECHNICAL FIELD

The present disclosure is generally related to wireless communications and, more particularly, to timing handling for integration of terrestrial network (TN) and non-terrestrial network (NTN) communications.

BACKGROUND

Unless otherwise indicated herein, approaches described in this section are not prior art to the claims listed below and are not admitted as prior art by inclusion in this section.

The convergence of NTN communication and TN communication is a way of providing global network coverage. NTN communications can supplement TNs wherever necessary. Additionally, NTNs can provide communication services in areas where there is no TN services, such as oceans, deserts, mountains and high altitudes. In addition, NTN communications can also be used as a backup solution for TNs. When TN services are unavailable for some reason, a terminal (herein interchangeably referred to as a user equipment (UE)) can attempt to communicate through an NTN.

Regarding the integration of NTN communication and TN communication, the same communication architecture and the same waveform can be used. Through lower-layer integration of the communication systems, development cost of terminals/UEs and base stations can be greatly reduced. Take terminal development as an example, the integration scheme of NTN communication and TN communication allows usage of a chip in terrestrial and non-terrestrial network communications. Compared with the need for two sets of equipment for individual support, the cost of a terminal can thus be reduced.

However, there tends to be a greater propagation delay in NTN communications compared to that in TN communications. This is due to the fact that the higher a satellite of an NTN is from the Earth the greater the propagation delay there is. There is, therefore, a need for a timing handling mechanism for integrating TN and NTN communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure aims to provide schemes, solutions, concepts, designs, methods and systems to address aforementioned issue associated with difference in propagation delays between NTN communications and TN communications. Specifically, various proposed schemes in accordance with the present disclosure aim to provide a timing handling mechanism for integrating TN and NTN communications. More specifically, the proposed timing handling mechanism may support UEs with location information (e.g., provided by the Global Navigation Satellite System (GNSS)) as well as UEs without location information.

In one aspect, a method may involve a UE establishing communications with a TN node in a TN. The method may also involve the UE establishing communications with an NTN node in an NTN. The method may further involve the UE compensating for a first propagation delay in the communications between the UE and the NTN node by the UE, with the UE being able to obtain a second propagation delay between the UE and the NTN node.

In another aspect, an apparatus implementable in a UE may include a transceiver and a processor coupled to the transceiver. In operation, the processor may be configured to perform certain operations. For instance, the processor may establish, via the transceiver, communications with a TN node in a TN. The processor may also establish, via the transceiver, communications with an NTN node in an NTN. The processor may further compensate for a first propagation delay in the communications between the UE and the NTN node by the UE. The processor may be configured to obtain a second propagation delay between the UE and the NTN node.

It is noteworthy that, although description provided herein may be in the context of certain radio access technologies, networks and network topologies such as narrowband Internet of Things (NB-IoT) and NTN, the proposed concepts, schemes and any variation(s)/derivative(s) thereof may be implemented in, for and by other types of radio access technologies, networks and network topologies such as, for example and without limitation, 5th Generation (5G) and New Radio (NR), Long-Term Evolution (LTE), LTE-Advanced, LTE-Advanced Pro, Internet of Things (IoT) and Industrial Internet of Things (IIoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to timing handling for integration of TN and NTN communications. According to the present disclosure, a number of possible solutions may be implemented separately or jointly. That is, although these possible solutions may be described below separately, two or more of these possible solutions may be implemented in one combination or another.

Figure 1:
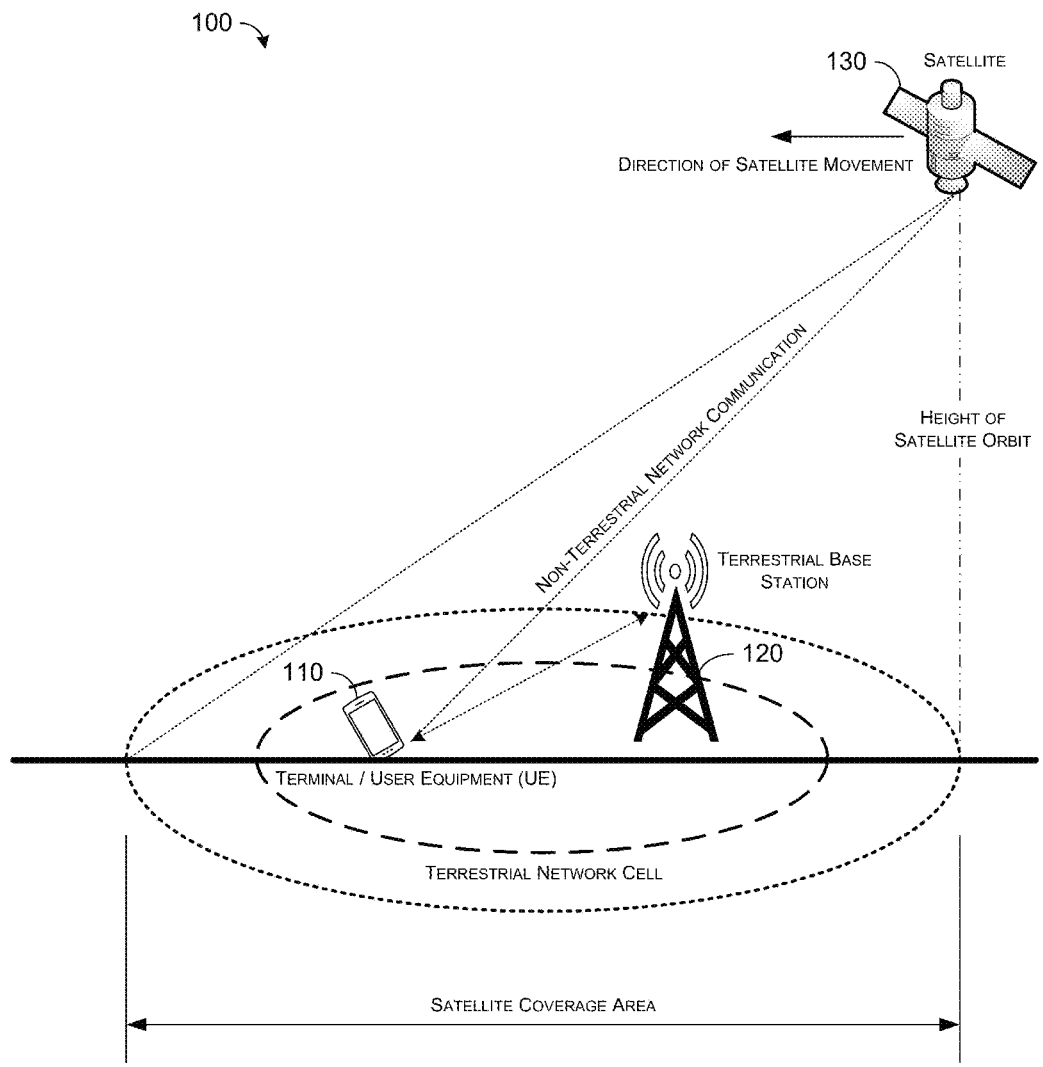
FIG. 1 is a diagram of a communication environment including a terminal supporting TN communication and NTN communication in accordance with various implementations of the present disclosure.

FIG. 1 illustrates an example communication environment 100 in accordance with various implementations of the present disclosure. FIG. 2~FIG. 7 illustrate examples related to proposed schemes and various implementations of the present disclosure. The following description of various proposed schemes of the present disclosure is provided with reference to FIG. 1~FIG. 7.

Referring to FIG. 1, communication environment 100 may involve a terminal or UE 110 supporting TN communication and NTN communication. UE 110 may be in communication with a ground base station 120 of a TN (not shown), such as a public land mobile network (PLMN), and a satellite 130 as a non-terrestrial (NT) network node of an NTN (not shown). Base station 120 may be a network node of TN, and satellite 130 may be a network node of the NTN. That is, base station 120 may be considered as a terrestrial network node and satellite 130 may be considered as a non-terrestrial network node. Base station 120 may be a gNB, eNB or transmit-receive point (TRP). Satellite 130 may be a low-orbit satellite that orbits the Earth at an altitude of 600 kilometers (km) above the ground. Moreover, the speed of satellite 130 may be 7.56 km per second (km/s), for example. In communication environment 100, each of UE 110, base station 120 and satellite 130 may be configured to implement various schemes pertaining to timing handling for integration of TN and NTN communications in accordance with the present disclosure, as described below.

According to some embodiments of the invention, the term "T_com" denotes a common propagation delay in one beam/cell; the term "T_prop" denotes an actual/estimated/obtained propagation delay; the term "T_prop_max" denotes a maximum T_prop in one beam/cell in which the UE located, or a maximum T_prop of all the cells that in coverage of a base station in NTN node that serves the UE; the term "T_diff" denotes a differential propagation delay between UEs; the term "T_diff_max" denotes a maximum T_diff in one beam/cell in which the UE located, or a maximum T_diff of all the cells that in coverage of a base station in NTN node that serves the UE; the term "X" denotes a delay time form a base station (e.g., base station 120) receiving a physical random access channel (PRACH) to transmission of a physical downlink control channel (PDCCH) with random access radio network temporary identifier (RA-RNTI); the term "k0" denotes a delay time from a UE (e.g., UE 110) receiving a random access response (RAR) to transmission of a message 3 (MSG3); and the term "X3" denotes a delay time from the base station receiving MSG3 to transmission of PDCCH with a message 4 (MSG4) schedule. The term "k1" denotes a delay time from the UE receiving downlink control information (DCI) format NO (DCI NO) to transmission of a physical uplink shared channel (PUSCH); and the term "X4" denotes a delay time from the base station receiving the PUSCH to transmission of an UL acknowledgement/negative acknowledgement (ACK/NACK). The term "k2" denotes a delay time from the UE receiving a physical downlink shared channel (PDSCH) to transmission of a DL ACK/NACK. The above delay times can be represented by any unit in time domain. These delay times can be different or the same.

Signal Time Delays in NTN

Figure 2:
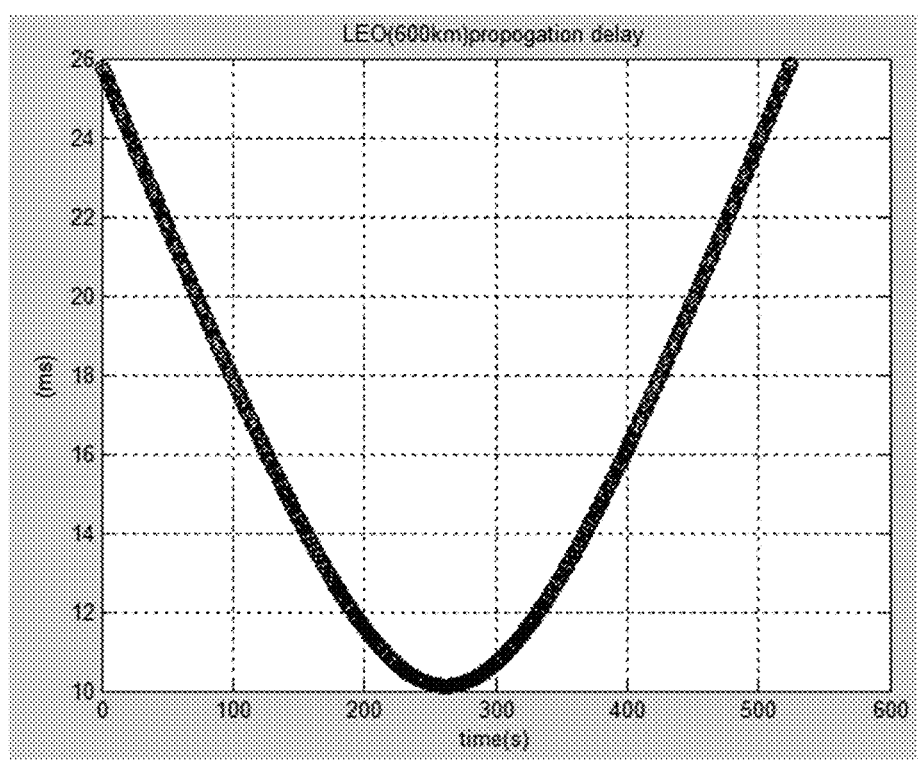
FIG. 2 is a diagram of an example scenario of propagation delay associated with a low-Earth-orbit (LEO) satellite.
Figure 3:
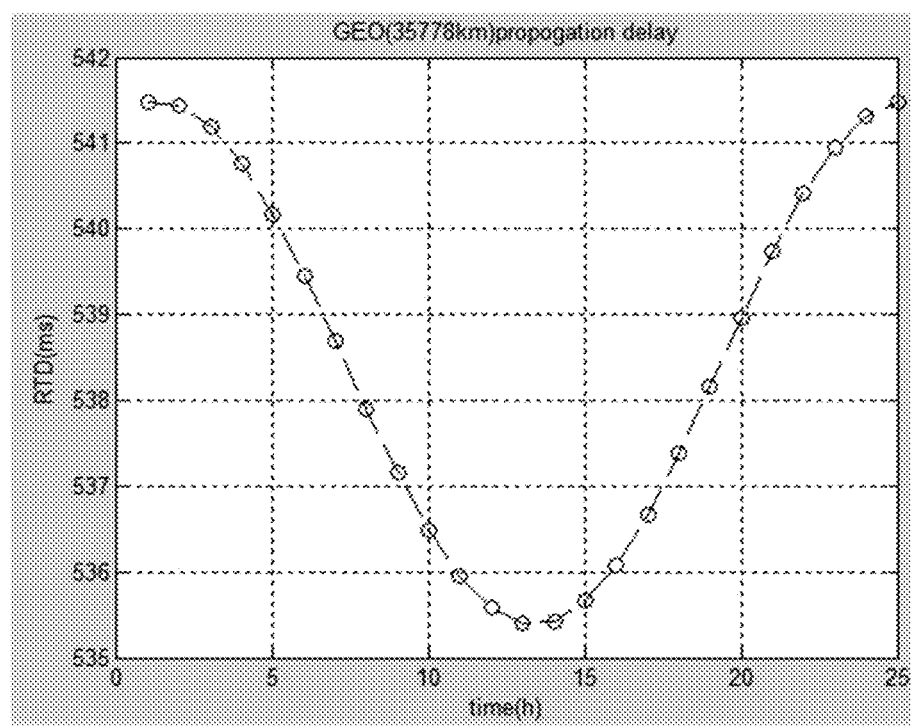
FIG. 3 is a diagram of an example scenario of propagation delay associated with a geosynchronous-equatorial-orbit (GEO) satellite.

Due to the high altitude of satellite 130, the communication distance between UE 110 and satellite 130 tends to be relatively long compared to that between UE 110 and base station 120. As a result, signal delay of the NTN is relatively large. In an example with satellite 130 being an LEO satellite with an altitude of 600 km, assuming that UE 110 enters the coverage area of satellite 130 at an elevation of 10 degrees, a maximum round-trip propagation delay from UE 110 to satellite 130 can reach 12.89 milliseconds (ms) for a regenerative payload. For illustrative purposes and without limiting the scope of the present disclosure, an example scenario 200 of propagation delay associated with satellite 130 as an LEO is shown in FIG. 2. In case that base station 120 is on the ground and satellite 130 is responsible for signal relaying (e.g., a transparent payload), the maximum round-trip propagation delay from UE 110 to the ground base station 120 can reach 25.77 ms. In another example with satellite 130 being a GEO satellite with an altitude of 35786 km, assuming that UE 110 enters the coverage area of satellite 130 at an elevation of 10 degrees, a maximum round-trip propagation delay from UE 110 to satellite 130 can reach 270.73 ms for a regenerative payload. For illustrative purposes and without limiting the scope of the present disclosure, an example scenario 300 of propagation delay associated with satellite 130 as a GEO is shown in FIG. 3. In case that base station 120 is on the ground and satellite 130 is responsible for signal relaying (e.g., a transparent payload), the maximum round-trip propagation delay from UE 110 to the ground base station 120 can reach 541.46 ms.

Figure 4:
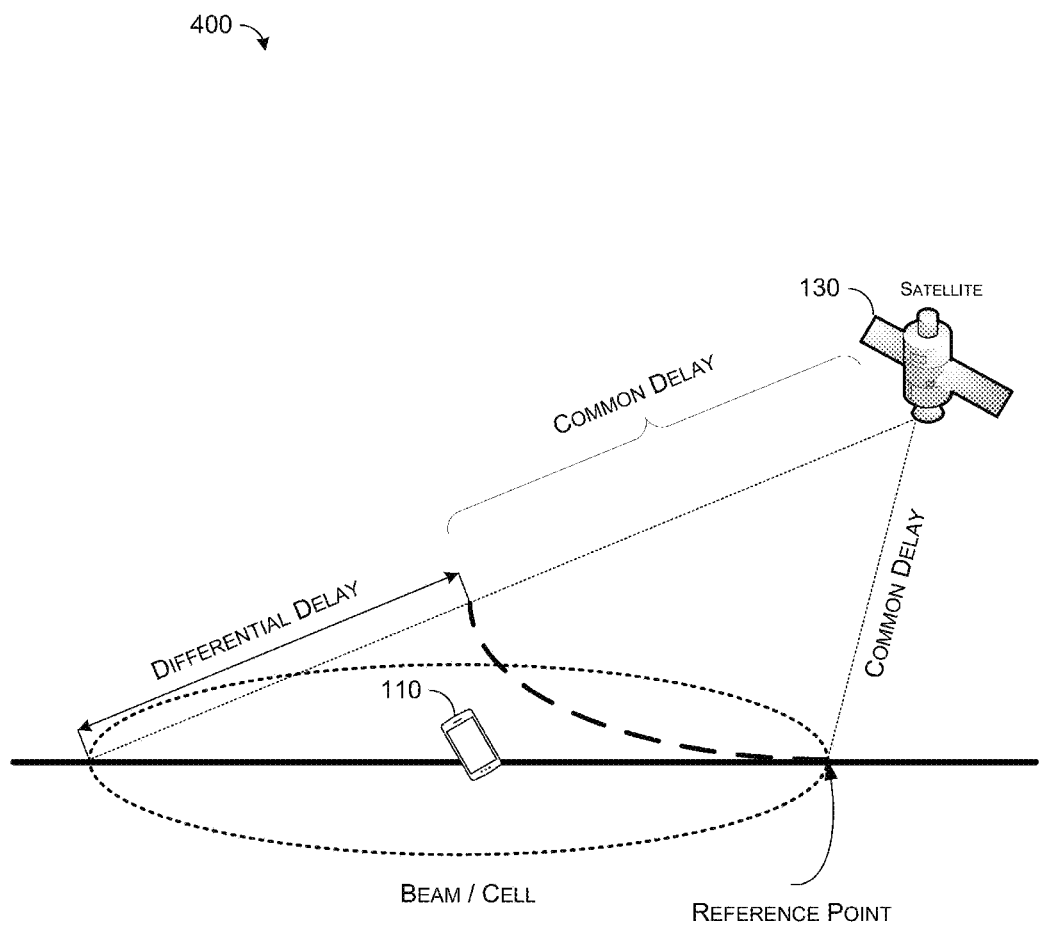
FIG. 4 is a diagram of an example scenario of common propagation delay and differential propagation delay of an LEO satellite.

In order to increase system capacity and to efficiently integrate NTN and TN communications, NTN coverage may be divided into several beams/cells. Propagation delay handling of each beam/cell may involve taking a point or location of a nearest distance between UE 110 and satellite 130 in a given cell as a reference point and setting the propagation delay of this point as the common propagation delay. The common propagation delay in abeam may be pre-compensated by satellite 130 or UE 110, and the differential propagation delay may be supported by the communication system design. Additionally, propagation delays of other points or locations in that cell may be further divided into common delay(s) and differential delay(s). FIG. 4 shows an example scenario 400 of a common propagation delay and a differential propagation delay of satellite 130 as an LEO satellite orbiting at an altitude of 600 km above the ground.

Random Access Channel Timing Handling Mechanisms

With respect to PRACH timing handling, propagation delays may be divided into common delays and differential delays, and common delays may be compensated (e.g., by satellite 130 or UE 110) on a per-beam basis to reduce differential delay(s) between UEs in the beam or cell.

Under a proposed scheme in accordance with the present disclosure, location information of a given UE (e.g., UE 110) may be obtained through any positioning mechanisms such as, for example and without limitation, positioning by GNSS, calculation based on by positioning signaling, and any prior settings. Location information of satellite 130 may be obtained by ephemeris or almanac. Since the location information of UE 110 and satellite 130 are known by UE 110, the relative location of satellite 130 (and/or base station 120) with respect to UE 110 may be calculated by UE 110. As mentioned previously, compensation for common delay may be performed by either satellite 130 or UE 110 or a base station in NTN.

Preamble Transmission

Under a proposed scheme in accordance with the present disclosure, there may be situations in which compensation of preamble transmissions is performed by UE 110 as well as situations in which compensation of preamble transmissions is performed by satellite 130, as described below and as shown in scenarios 500, 600 and 700 of FIG. 5, FIG. 6 and FIG. 7, respectively. In case that common delay is compensated by UE 110 and UE 110 has no information on the relative location of satellite 130 (and/or a base station in NTN) with respect to UE 110, the system may inform UE 110 (e.g., via base station 120) a value of the common delay (T_com) regarding the beam or cell where UE 110 is located. For instance, the value of common delay associated with a given beam or cell may be provided in system information transmitted from base station 120 (or satellite 130) to UE 110. Alternatively, UE 110 may obtain the value of common delay in advance for example and without limitation, through ephemeris or almanac. Then, UE 110 may advance its preamble transmission by two times the value of common delay (e.g., 2*T_com). In case that common delay is compensated by UE 110 and UE 110 does have information on the relative location of satellite 130 (and/or base station 120) with respect to UE 110, UE 110 may transmit the preamble in advance by two times a propagation delay (T_prop) between UE 110 and satellite 130 (e.g., 2*T_prop ahead of DL timing of UE 110).

Under the proposed scheme, in case that common delay is compensated by satellite 130 and UE 110 has no information on the relative location of satellite 130 (and/or base station 120) with respect to UE 110, UE 110 may not need to advance its preamble transmission. That is, UE 110 may transmit its preamble as it does in the TN. Satellite 130 may delay its preamble detection window by two times the common delay regarding the beam or cell. In case that common delay is compensated by satellite 130 and UE 110 does have information on the relative location of satellite 130 (and/or base station 120) with respect to UE 110, the system may inform UE 110 (e.g., via base station 120) a value of the common delay regarding the beam or cell where UE 110 is located. Then, UE 110 may transmit its preamble in advance by two times a differential delay (T_diff) between UE 110 and satellite 130 (e.g., 2*T_diff ahead of DL timing of UE 110). The value of T_diff may be equal to the propagation delay between UE 110 and satellite 130 minus the common propagation delay regarding the beam or cell where UE 110 is located.

Table 1 below summarizes timing advance by UE 110 in preamble transmission in different situation. According to different embodiments, the UE 110 itself can obtain or estimate a propagation delay between the UE 110 and the NTN node. The UE 110 may have relative location information with respect to the NTN node (such as satellite, base station, and/or gateway). In other embodiments, the UE 110 itself cannot obtain or estimate a propagation delay between the UE 110 and the NTN node.

TABLE 1

Timing Advance in Preamble Transmission

| Common Delay Compensation | Advance in Preamble Transmission by UE Without Relative Location Information | Advance in Preamble Transmission by UE With Relative Location Information |
| --- | --- | --- |
| By UE | 2 * T_com | 2 * T_prop |
| By Satellite | No Timing Advance | 2 * T_diff |

Under a proposed scheme in accordance with the present disclosure, in case that UE 110 has no information on the relative location of satellite 130 (and/or base station 120) with respect to UE 110, the preamble design may cover the maximum differential delay (T_diff_max) in a beam/cell. Under the proposed scheme, a cyclic prefix of a preamble transmitted in NTN may be greater than 2*T_diff_max plus the maximum delay spread in NTN channel. For instance, a guard time or gap before and/or after preamble transmission may be greater than 2*T_diff_max. In case that UE 110 does have information on the relative location of satellite 130 (and/or base station 120) with respect to UE 110, the existing preambles used in TN may be applied in NTN as well, since T_diff is compensated by UE 110.

Random Access Response Timing

With respect to RAR timing, a base station (e.g., base station 120) may respond to UE(s) (e.g., UE 110) with RAR after receiving one or more preambles form the UE(s). It may take some time to prepare RAR content and/or wait for available DL resource(s) at the base station side. In general, base station 120 may transmit RAR in a duration between X subframes and (X+RAR receiving window) subframes after its preamble detection window. In TN, UE 110 may start a RAR receiving window to receive the RAR in X subframes after its preamble transmission. In case that UE 110 does not receive a RAR containing the preamble identification (ID) used by UE 110 in the RAR receiving window, the RACH procedure may be considered a failure. Accordingly, UE 110 may re-attempt to transmit another preamble to base station 120. Please note that even above embodiments are illustrated using subframes, in actual implementations X may be in terms of any unit in time domain. For instance, X may be represented by milliseconds or ms.

Figure 5:
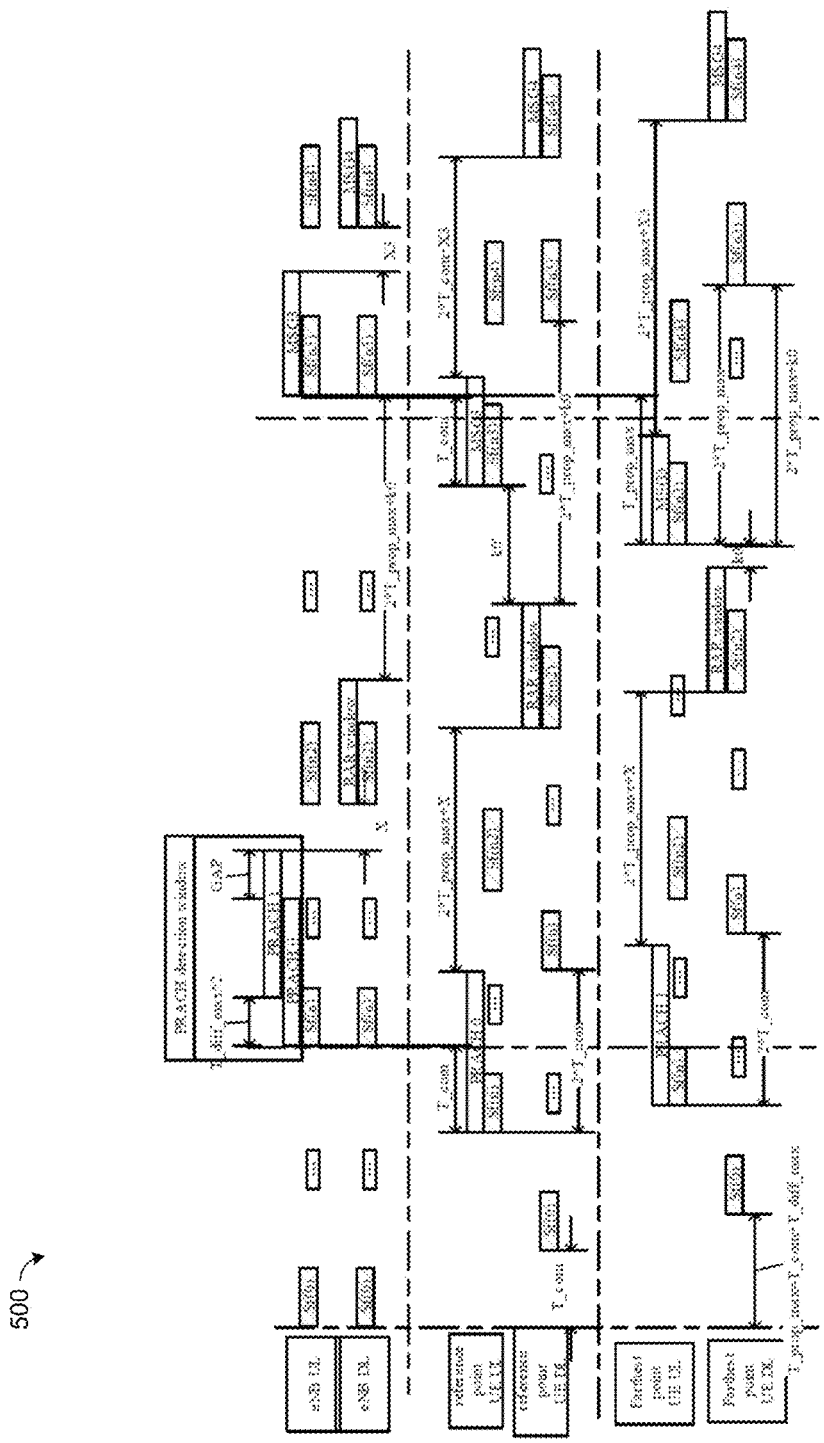
FIG. 5 is a diagram of an example scenario of timing handling mechanisms of random access channel (RACH) in accordance with various proposed schemes of the present disclosure.

In NTN, due to the propagation delay between UE 110 and satellite 130 being much greater, different approaches with respect to reception of RAR may be undertaking under a proposed scheme in accordance with the present disclosure and as shown in FIG. 5. In a first approach under the proposed scheme, differential propagation delay may be compensated by a UE 110. For instance, in an event that UE 110 has information on the relative location of satellite 130 (and/or base station 120) with respect to UE 110 and that differential propagation delay is compensated by UE 110, preambles transmitted by different UEs in a beam/cell would arrive at satellite 130/base station 120 within a preamble cyclic prefix. UE 110 may start its RAR receiving window by (X+2*T_prop) after its preamble transmission. Here, T_prop denotes the propagation delay of UE 110.

In a second approach under the proposed scheme, differential propagation delay may be not compensated by a UE 110. For instance, in an event that UE 110 does not have information on the relative location of satellite 130 (and/or base station 120) with respect to UE 110 and that differential propagation delay is not compensated by UE 110, preambles transmitted by nearest UE(s) and farthest UE(s) in a beam/cell would arrive at satellite 130/base station 120 with a time difference of 2*T_diff_max. There may be three different scenarios under the second approach, as described below and shown in FIG. 5.

In a first scenario, UE 110 may compensate preamble transmission by a delay of 2*T_com and may assume that base station 120 transmits RAR at X subframes delayed after the PRACH detection window, with X being a predefined number ≥1. UE 110 may start its RAR receiving window at no greater than (2*T_prop_max+X) after its preamble transmission. Here, T_prop_max denotes the maximum propagation delay in a beam/cell, or the maximum propagation of all the cells in coverage of a base station in NTN. The value of maximum propagation delay per cell or per beam may be provided in system information transmitted from base station 120 (or satellite 130) to UE 110. Alternatively, UE 110 may obtain the value of maximum propagation delay in advance, for example and without limitation, through ephemeris or almanac. Moreover, UE 110 may derive T_prop_max by adding T_com and T_diff_max in case that UE 110 can obtain values of T_com and T_diff_max from the system.

In a second scenario, UE 110 may start its RAR receiving window at (X+2*T_com) after its preamble transmission. Here, T_com denotes the common propagation delay in a beam/cell. In this case, RAR receiving window may be extended at least 2*T_diff_max comparing with that in the legacy TN system.

In a third scenario, a predefined value between UE 110 and base station 120, such as T_RAR_max, may be used for RAR receiving. For instance, UE 110 may start its RAR receiving window at (X+2*T_RAR_max) after its preamble transmission. This value may be the maximum possible propagation delay in a mobile communication system, not just the maximum propagation delay in a beam/cell. The value of T_RAR_max may be specified in a wireless communication specification/standard. Alternatively, UE 110 can obtain this value in advance or pre-stored it in its component or memory (e.g., the universal subscriber identity module (USIM)).

Timing Advance Adjustment

With respect to timing advance (TA) adjustment, a TA mechanism in NTN may be the same as that in TN in an event that the differential propagation delay is compensated by a UE under a proposed scheme in accordance with the present disclosure and as shown in FIG. 5. In case that differential propagation delay is not compensated by UE 110, preambles transmitted by nearest UEs and farthest UE(s) in a beam/cell would arrive at satellite 130/base station 120 with a time difference of 2*T_diff_max. In this case, satellite 130/base station 120 may obtain the timing advance information of a preamble detected in the preamble detection window and then, in RAR, inform the UE (e.g., UE 110) that transmitted the preamble of timing advance.

Given that value ranges of the maximum differential delay may be very different in TN, LEO, medium-Earth-orbit (MEO) and GEO, the bit widths of timing advance command (TAC) in RAR may be different for various mobile communication networks. For instance, base station 120 may broadcast bit width(s) of TAC in system information. Alternatively, bit widths may be predefined for different types of mobile communication networks. Hence, UE 110 may choose a suitable bit width of TAC based on the type of mobile communication network in which UE 110 is to engage in wireless communications. In one embodiment, the type of mobile communication networks may be broadcasted in system information by the identity of the public land mobile network (PLMN). Alternatively, the bit width(s) of TAC can be obtained by the UE, for instance, obtained from a component of the UE. In other embodiments the bit width(s) of TAC can be the same for the TN and NTN. In another embodiment, the bit width(s) of TAC in the NTN may or may not be larger than that of the current TN.

Message 3 Timing Scheduling

In legacy TN systems, such as narrowband Internet of Things (NB-IoT) a base station (e.g., base station 120) may schedule an UL grant for MSG3 transmission in RAR. The time-frequency resource(s) of UL grant for MSG3 transmission may be indicated in the RAR. Since a UE (e.g., UE 110) needs time to decode RAR and to prepare MSG3, there is a scheduling delay of MSG3 transmission with the value of k0 after reception of RAR by the UE.

In NTN, since the propagation delay is much larger than that in TN and the timing advance value might be much larger as well, the base station might not know which UE(s) provided feedback on the same RAR. The scheduling delay of MSG3 transmission may be large enough for a UE to decode RAR and to prepare MSG3 to perform the MSG3 transmission. Thus, the MSG3 reception at the base station side may be aligned in time as scheduled.

Under a proposed scheme in accordance with the present disclosure and as shown in FIG. 5, in case that common propagation delay is compensated by UE 110, a delay of MSG3 transmission equal to (2*T_prop_max+k0) may be indicated in an RAR. Alternatively, with an indication in RAR of a MSG3 scheduling delay equal to k0, UE 110 may itself add an additional delay of 2*T_prop_max based on k0. The value of T_prop_max in MSG3 timing scheduling may be consistent with RAR timing scheduling.

Under the proposed scheme, in case that common propagation delay is compensated by satellite 130, a delay of MSG3 transmission equal to (2*T_diff_max+k0) may be indicated in an RAR. Alternatively, with an indication in RAR of a MSG3 scheduling delay by k0, UE 110 may itself add an additional delay of (2*T_diff_max) based on k0. The value of T_diff_max in MSG3 timing scheduling may be consistent with RAR timing scheduling.

Under the proposed scheme, T_prop_max or T_diff_max per beam or per cell may be provided in system information transmitted from base station 120 (or satellite 130) to UE 110. Alternatively, UE 110 may obtain values of the maximum propagation delay in advance, for example and without limitation, through ephemeris or almanac. Moreover, UE 110 may derive T_prop_max by adding T_com and T_diff_max in case that UE 110 can obtain values of T_com and T_diff_max from the system.

Message 4 Timing Scheduling

After a MSG3 is transmitted by a UE (e.g., UE 110), a base station (e.g., base station 120) may transmit to the UE a MSG4 containing contention resolution. The base station may delay MSG4 transmission by X3 after MSG3 is detected, with X3 being the scheduling delay of MSG4 in a TN system. The UE may start a contention resolution timer to receive MSG4 after MSG3 is transmitted. The value of the contention resolution timer may be at least greater than the scheduling delay of MSG4.

In NTN, since the propagation delay is much larger than that in TN, there may be two approaches to starting a contention resolution timer on the UE side under a proposed scheme in accordance with the present disclosure and as shown in FIG. 5.

Under a first approach according to the proposed scheme, similar to in TN, UE 110 in NTN may start the contention resolution timer after MSG3 is transmitted. Then, the value of the contention resolution timer may be at least greater than (2*T_prop+X3). Under a second approach according to the proposed scheme, UE 110 in NTN may start the contention resolution timer at a delay of 2*T_prop after MSG3 is transmitted. Since the transmission of MSG4 would traverse through the propagation delay between satellite 130/base station 120 and UE 110, UE 110 may delay MSG4 detection so as to conserve power.

Uplink Shared Channel Timing Scheduling in Connected Mode

In a radio resource control (RRC) connected mode, the timing advance value may be adjusted by a base station (e.g., base station 120) so that UL data reception at the base station may be timing aligned. In legacy TN systems, there is a scheduling delay k1 between a PDCCH for sending an UL grant and a scheduled PUSCH for UL data transmission.

Figure 6:
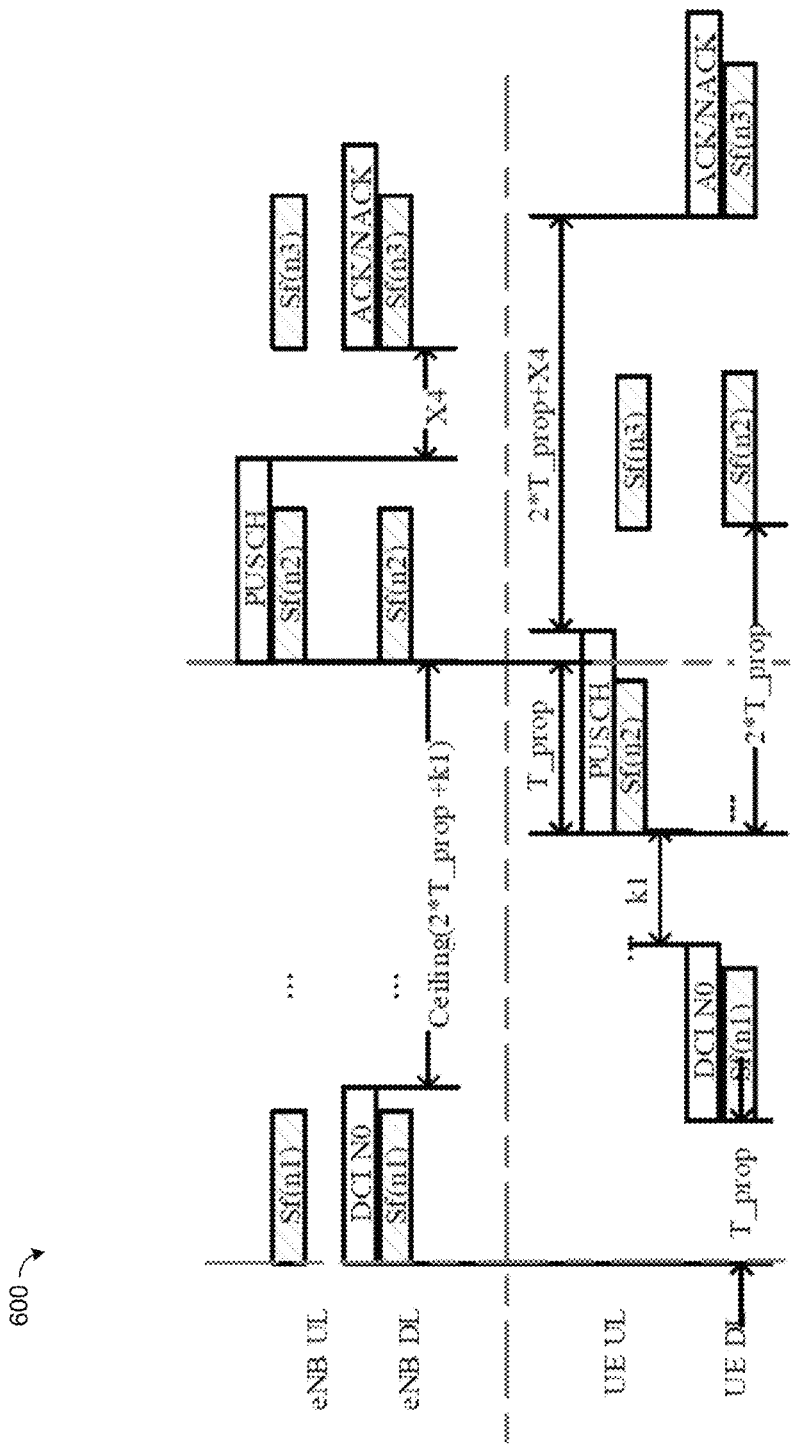
FIG. 6 is a diagram of example scenarios of timing handling mechanisms of uplink (UL) transmission in a connected mode in accordance with various proposed schemes of the present disclosure.

In NTN systems, under a proposed scheme in accordance with the present disclosure and as shown in FIG. 6, a scheduling delay k1 between PDCCH and PUSCH may be extended in addition to accommodating the greater timing advance by the UE in its PUSCH transmission. Under the proposed scheme, a scheduling delay of (2*T_prop+k1) between PDCCH and PUSCH may be scheduled by base station 120. Accordingly, UE 110 may advance its PUSCH transmission by 2*T_prop, and base station 120 may receive the PUSCH from UE 110 at (2*T_prop+k1) after PDCCH transmission. For instance, base station 120 may transmit a hybrid automatic repeat request acknowledgement (HARQ-ACK) to UE 110 with a delay of X4 after PUSCH is detected. The HARQ-ACK may arrive at UE 110 at (2*T_prop+X4) after the PUSCH transmission. In some embodiments, only HARQ-ACK is used. In some other embodiments, HARQ-ACK and HARQ-negative acknowledgement (NACK) are used.

In case that UE 110 has no a priori information regarding the relative location of satellite 130 (and/or base station 120) with respect to UE 110, base station 120 may obtain delay information on UE 110 through preamble detection to determine the timing advance value for UE 110, so that base station 120 has full information on where to detect the PUSCH after an UL grant has been transmitted to UE 110.

In case that UE 110 has a prior information regarding the relative location of satellite 130 (and/or base station 120) with respect to UE 110 and performs pre-compensation of propagation delay or differential delay, base station 120 may not have full information on the total propagation delay of UE 110 through a legacy RACH procedure. Accordingly, UE 110 may report the propagation delay or differential delay to base station 120 (e.g., via MSG3).

In case that UE 110 does not report pre-compensation of propagation delay to base station 120 and common propagation delay is compensated by UE 110, UE 110 may transmit PUSCH with a delay no less than (2*T_prop_max+k1−2*T_prop) after receiving an UL grant (via DCI NO). Moreover, base station 120 may receive PUSCH with a delay no less than 2*T_prop_max+k1 after transmitting the UL grant (via DCI NO). The value of T_prop_max may be consistent with RAR timing scheduling.

In case that UE 110 does not report pre-compensation of propagation delay to base station 120 and common propagation delay is compensated by satellite 130, UE 110 may transmit PUSCH with a delay no less than (2*T_diff_max+k1−2*T_diff) after receiving an UL grant (via DCI NO). Additionally, base station 120 may receive PUSCH with a delay no less than (2*T_diff_max+k1) after transmitting the UL grant (via DCI NO, a signaling scheduling uplink). The value of T_diff_max may be consistent with RAR timing scheduling.

Under the proposed scheme, T_prop_max or T_diff_max per beam or per cell may be provided in system information transmitted from base station 120 (or satellite 130) to UE 110. Alternatively, UE 110 may obtain above values of the maximum propagation delay in advance, for example and without limitation, through ephemeris or almanac. Moreover, UE 110 may derive T_prop_max by adding T_com and T_diff_max in case that UE 110 can obtain values of T_com and T_diff_max from the system.

Downlink Shared Channel Timing Scheduling in Connected Mode

In legacy TN systems, there is a scheduling delay k1 between PDCCH and a scheduled PDSCH for DL data transmission. After receiving the PDSCH, a UE (e.g., UE 110) may reply to a base station (e.g., base station 120) with a HARQ-ACK to inform the base station whether or not the PDSCH is successfully decoded. There is a scheduling delay k2 between PDSCH reception and HARQ-ACK feedback by the UE due to the UE needing time to decode the PDSCH and to prepare the HARQ-ACK. Please note that k1 and k2 may or may not be the same. In some embodiments, only HARQ-ACK may be used. In some other embodiments, HARQ-ACK and HARQ-NACK may be used.

Figure 7:
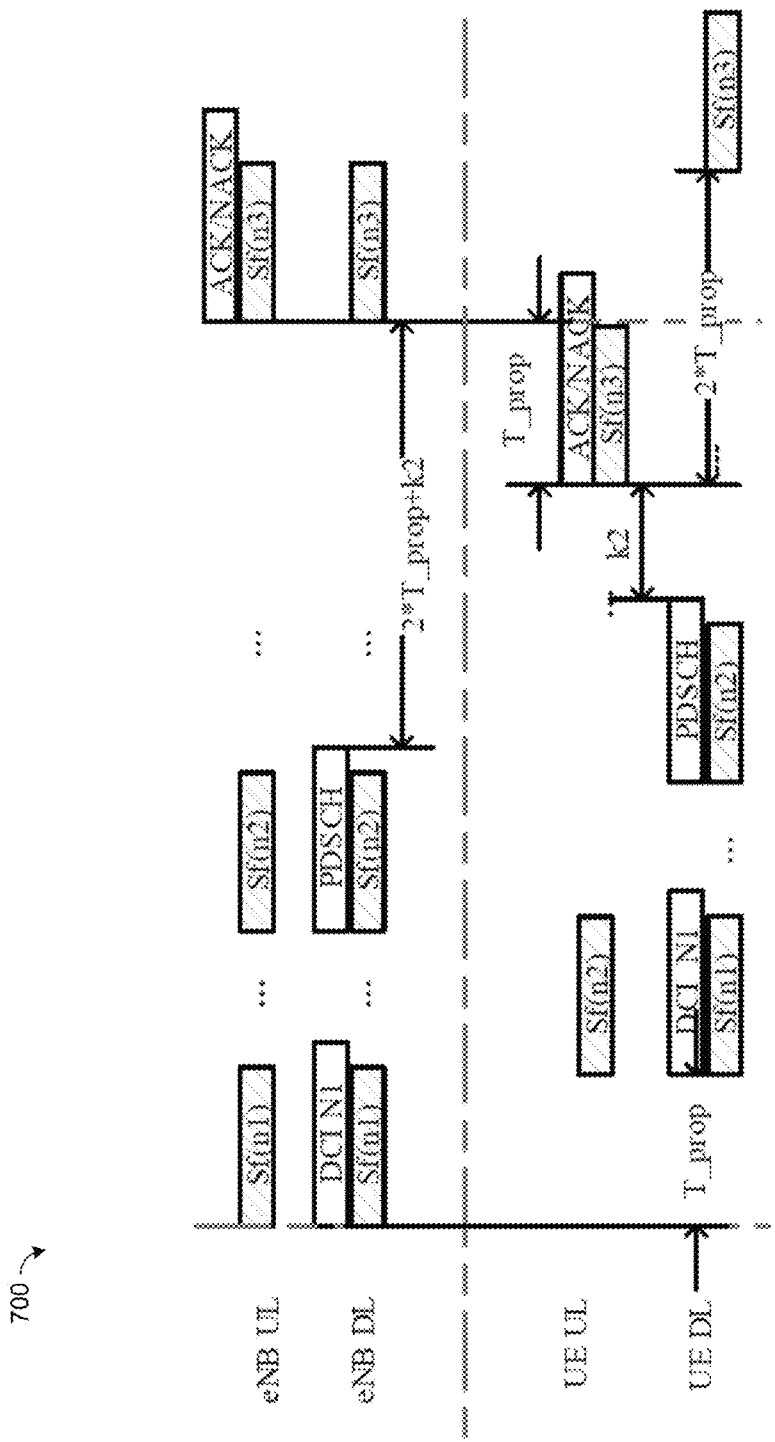
FIG. 7 is a diagram of example scenarios of timing handling mechanisms of downlink (DL) transmission in a connected mode in accordance with various proposed schemes of the present disclosure.

In NTN systems, under a proposed scheme in accordance with the present disclosure and as shown in FIG. 7, a scheduling delay between PDSCH reception and HARQ-ACK feedback by a UE may be extended in addition to accommodating the greater timing advance by the UE in its HARQ-ACK transmission. Under the proposed scheme, a scheduling delay of (2*T_prop+k2) between PDSCH reception and HARQ-ACK feedback by UE 110 may be scheduled by base station 120. UE 110 may advance its HARQ-ACK transmission by 2*T_prop. Base station 120 may receive the HARQ-ACK from UE 110 at (2*T_prop+k2) after PDCCH transmission.

Similar to PUSCH reception, in case that UE 110 has no a prior information on the relative location of satellite 130 (and/or base station 120) with respect to UE 110, base station 120 may obtain delay information on UE 110 through preamble detection to determine the timing advance value of UE 110, so that base station 120 has full information on where to detect the HARQ-ACK from UE 110.

In case that UE 110 has a prior information on the relative location of satellite 130 (and/or base station 120) with respect to UE 110 and performs pre-compensation of the propagation delay or differential delay, base station 120 may not have the full information on the total propagation delay of UE 110 through a legacy RACH procedure. Accordingly, UE 110 may report the propagation delay or differential delay to base station 120 (e.g., via MSG3).

In case that UE 110 does not report pre-compensation of the propagation delay to base station 120 and common propagation delay is compensated by UE 110, UE 110 may delay transmission of HARQ-ACK by no less than (2*T_prop_max+k2−2*T_prop) after PDSCH transmission. The value of T_prop_max may be consistent with RAR timing scheduling.

In case that UE 110 does not report pre-compensation of the propagation delay to base station 120 and common propagation delay is compensated by satellite 130, UE 110 may delay transmission of HARQ-ACK by no less than (2*T_diff_max+k2−2*T_diff) after PDSCH detection. Moreover, base station 120 may delay reception of HARQ-ACK by no less than (2*T_diff_max+k2) after PDSCH transmission. The value of T_diff_max may be consistent with RAR timing scheduling.

Under the proposed scheme, T_prop_max or T_diff_max per beam or per cell may be provided in system information transmitted from base station 120 (or satellite 130) to UE 110. Alternatively, UE 110 may obtain values of the maximum propagation delay in advance, for example and without limitation, through ephemeris or almanac. Moreover, UE 110 may derive T_prop_max by adding T_com and T_diff_max in case that UE 110 can obtain values of T_com and T_diff_max from the system.

Please note that in some embodiments, each of the above mentioned formulas may be put into a ceiling function.

Illustrative Implementations

Figure 8:
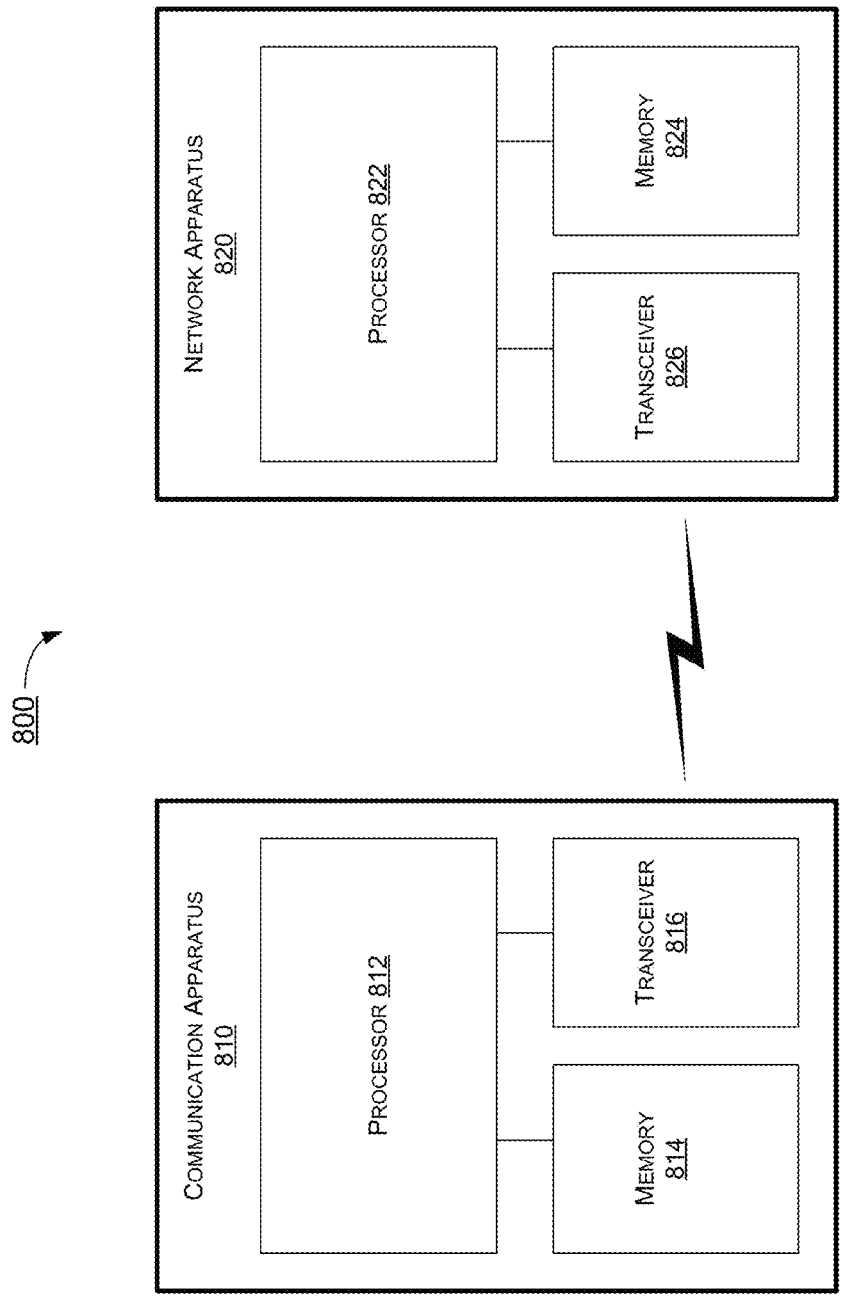
FIG. 8 is a block diagram of an example communication system in accordance with an implementation of the present disclosure.

FIG. 8 illustrates an example communication system 800 having an example apparatus 810 and an example apparatus 820 in accordance with an implementation of the present disclosure. Each of apparatus 810 and apparatus 820 may perform various functions to implement schemes, techniques, processes and methods described herein pertaining to timing handling for integration of TN and NTN communications, including various schemes described above as well as process 800 described below.

Each of apparatus 810 and apparatus 820 may be a part of an electronic apparatus, which may be a UE such as a portable or mobile apparatus, a wearable apparatus, a wireless communication apparatus or a computing apparatus. For instance, each of apparatus 810 and apparatus 820 may be implemented in a smartphone, a smartwatch, a personal digital assistant, a digital camera, or a computing equipment such as a tablet computer, a laptop computer or a notebook computer. Each of apparatus 810 and apparatus 820 may also be a part of a machine type apparatus, which may be an IoT, IIoT or NB-IoT apparatus such as an immobile or a stationary apparatus, a home apparatus, a wire communication apparatus or a computing apparatus. For instance, each of apparatus 810 and apparatus 820 may be implemented in a smart thermostat, a smart fridge, a smart door lock, a wireless speaker or a home control center. Alternatively, each of apparatus 810 and apparatus 820 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. Each of apparatus 810 and apparatus 820 may include at least some of those components shown in FIG. 8 such as a processor 812 and a processor 822, respectively. Each of apparatus 810 and apparatus 820 may further include one or more other components not pertinent to the proposed scheme of the present disclosure (e.g., internal power supply, display device and/or user interface device), and, thus, such component(s) of each of apparatus 810 and apparatus 820 are neither shown in FIG. 8 nor described below in the interest of simplicity and brevity.

In some implementations, at least one of apparatus 810 and apparatus 820 may be a part of an electronic apparatus, which may be a network node, a satellite or base station (e.g., eNB, gNB or TRP), a small cell, a router or a gateway. For instance, at least one of apparatus 810 and apparatus 820 may be implemented in an eNodeB in an LTE, LTE-Advanced or LTE-Advanced Pro network or in a gNB in a 5G, NR, IoT or NB-IoT network. Alternatively, at least one of apparatus 810 and apparatus 820 may be implemented in the form of one or more IC chips such as, for example and without limitation, one or more single-core processors, one or more multi-core processors, or one or more CISC or RISC processors.

In one aspect, each of processor 812 and processor 822 may be implemented in the form of one or more single-core processors, one or more multi-core processors, or one or more CISC or RISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including timing handling for integration of TN and NTN communications in accordance with various implementations of the present disclosure.

In some implementations, apparatus 810 may also include a transceiver 816 coupled to processor 812 and capable of wirelessly transmitting and receiving data. In some implementations, apparatus 810 may further include a memory 814 coupled to processor 812 and capable of being accessed by processor 812 and storing data therein. In some implementations, apparatus 820 may also include a transceiver 826 coupled to processor 822 and capable of wirelessly transmitting and receiving data. In some implementations, apparatus 820 may further include a memory 824 coupled to processor 822 and capable of being accessed by processor 822 and storing data therein. Accordingly, apparatus 810 and apparatus 820 may wirelessly communicate with each other via transceiver 816 and transceiver 826, respectively.

To aid better understanding, the following description of the operations, functionalities and capabilities of each of apparatus 810 and apparatus 820 is provided in the context of communication environment 100 in which apparatus 810 is implemented in or as a wireless communication device, a communication apparatus or a UE (e.g., UE 110) and apparatus 820 is implemented in or as a network node (e.g., base station 120 or satellite 130).

In one aspect of timing handling for integration of TN and NTN communications in accordance with the present disclosure, processor 812 of apparatus 810, as UE 110, may establish, via transceiver 816, communications between apparatus 810 and a TN node of a TN as well as communications between apparatus 810 and an NTN node of an NTN. Additionally, processor 812 may compensate for a first propagation delay in the communications between apparatus 810 and the NTN node. Moreover, processor 812 may be able to obtain a second propagation delay between apparatus 810 and the NTN node.

In some implementations, in compensating for the first propagation delay, processor 812 may compensate for the first propagation delay based on at least one of (1) the second propagation delay obtained by apparatus 810 and (2) a maximum propagation delay. Moreover, the maximum propagation delay may be a first maximum propagation delay of a cell or beam in which apparatus 810 is located or a second maximum propagation delay of all cells in coverage of a base station (e.g., base station 120) in the NTN.

In some implementations, processor 812 may also advance a preamble transmission by two times the second propagation delay.

In some implementations, processor 812 may also start an RAR receiving window after a preamble transmission by a first delay time plus two times the maximum propagation delay. Additionally, processor 812 may further indicate a MSG3 delay with a value of a second delay time plus two times the maximum propagation delay in the RAR. In some implementations, processor 812 may further receive a MSG 4 after transmitting the MSG3 by a third delay time plus two times the maximum propagation delay. Alternatively, or additionally, processor 812 may further set a TA of the MSG 3 between UL and DL transmissions as a fourth delay time plus two times the maximum propagation delay.

In some implementations, processor 812 may also transmit a PUSCH after receiving a DCI NO by a fifth delay time. In some implementations, processor 812 may further set a TA of the PUSCH between UL and DL transmissions as two times the first propagation delay. Alternatively, or additionally, processor 812 may further receive a feedback having an ACK or a NACK, or both, after transmitting the PUSCH by a sixth delay time plus two times the first propagation delay.

In some implementations, processor 812 may also transmit a feedback having an ACK or a NACK, or both, after receiving a PDSCH by a seventh delay time. In some implementations, processor 812 may further set a TA of the feedback between UL and DL transmissions as two times the first propagation delay.

In some implementations, processor 812 may obtain the second propagation delay using information on a relative location between apparatus 810 and the NTN node based on at least one of the following: (a) positioning information provided by a GNSS, (b) positioning signaling received by apparatus 810 from the TN or the NTN, (c) a prior setting of apparatus 810, (d) an almanac or ephemeris related to the NTN node, and (e) information stored in a component of apparatus 810.

In some implementations, the maximum propagation delay may be determined by at least one of the following: (a) system information received from the NTN node, (b) an almanac or ephemeris related to the NTN node, (c) a value specified in a wireless communication standard, (d) a value derived by apparatus 810, and (e) information stored in a component of apparatus 810.

In some implementations, processor 812 may also obtain information on a relative location of apparatus 820, as an NT network node, with respect to apparatus 810 based on one or more of: (1) positioning information provided by a GNSS, (2) positioning signaling received by apparatus 810 from the TN or the NTN, (3) a prior setting of apparatus 810, (4) an almanac or ephemeris related to apparatus 820, as the NT network node, and (5) information stored in a component of apparatus 810 (e.g., a universal subscriber identity module (U-SIM) as part of or in addition to memory 814).

In some implementations, processor 812 may further obtain information on the common delay and a maximum propagation delay in a cell in which apparatus 810 is located based on one or more of: (1) system information received by apparatus 810 from the TN or the NTN, (2) an almanac or ephemeris related to apparatus 820, as the NT network node, and (3) information stored in a component of apparatus 810 (e.g., a U-SIM).

Illustrative Processes

Figure 9:
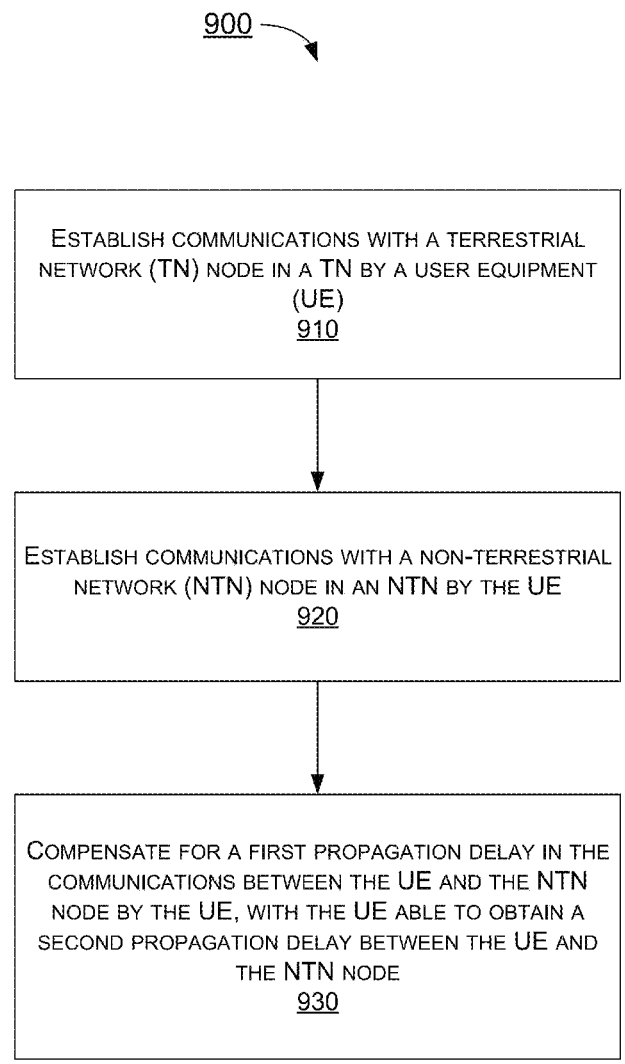
FIG. 9 is a flowchart of an example process in accordance with an implementation of the present disclosure.

FIG. 9 illustrates an example process 900 in accordance with an implementation of the present disclosure. Process 900 may be an example implementation of the proposed schemes described above with respect to timing handling for integration of TN and NTN communications in accordance with the present disclosure. Process 900 may represent an aspect of implementation of features of apparatus 810 and apparatus 820. Process 900 may include one or more operations, actions, or functions as illustrated by one or more of blocks 910, 920 and 930. Although illustrated as discrete blocks, various blocks of process 900 may be divided into additional blocks, combined into fewer blocks, or eliminated, depending on the desired implementation. Moreover, the blocks of process 900 may be executed in the order shown in FIG. 9 or, alternatively, in a different order. Process 900 may also be repeated partially or entirely. Process 900 may be implemented by apparatus 810, apparatus 820 and/or any suitable wireless communication device, UE, base station or machine type devices. Solely for illustrative purposes and without limitation, process 900 is described below in the context of apparatus 810 as a UE (e.g., UE 110) and apparatus 820 as a network node (e.g., base station 120 or satellite 130). Process 900 may begin at block 910.

At 910, process 900 may involve processor 812 of apparatus 810, as UE 110, establishing, via transceiver 816, communications with a TN node of a TN. Process 900 may proceed from 910 to 920.

At 920, process 900 may involve processor 812 establishing, via transceiver 816, communications with an NTN node of an NTN. Process 900 may proceed from 920 to 930.

At 930, process 900 may involve processor 812 compensating for a first propagation delay in the communications between the UE and the NTN node, with processor 812 being able to obtain a second propagation delay between the UE and the NTN node.

In some implementations, in compensating for the first propagation delay, process 900 may involve processor 812 compensating for the first propagation delay based on at least one of (1) the second propagation delay obtained by apparatus 810 and (2) a maximum propagation delay. Moreover, the maximum propagation delay may be a first maximum propagation delay of a cell or beam in which apparatus 810 is located or a second maximum propagation delay of all cells in coverage of a base station (e.g., base station 120) in the NTN.

In some implementations, process 900 may also involve processor 812 advancing a preamble transmission by two times the second propagation delay.

In some implementations, process 900 may also involve processor 812 starting an RAR receiving window after a preamble transmission by a first delay time plus two times the maximum propagation delay. Additionally, process 900 may further involve processor 812 indicating a MSG3 delay with a value of a second delay time plus two times the maximum propagation delay in the RAR. In some implementations, process 900 may further involve processor 812 receiving a MSG 4 after transmitting the MSG3 by a third delay time plus two times the maximum propagation delay. Alternatively, or additionally, process 900 may further involve processor 812 setting a TA of the MSG 3 between UL and DL transmissions as a fourth delay time plus two times the maximum propagation delay.

In some implementations, process 900 may also involve processor 812 transmitting a PUSCH after receiving a DCI NO by a fifth delay time. In some implementations, process 900 may further involve processor 812 setting a TA of the PUSCH between UL and DL transmissions as two times the first propagation delay. Alternatively, or additionally, process 900 may further involve processor 812 receiving a feedback having an ACK or a NACK, or both, after transmitting the PUSCH by a sixth delay time plus two times the first propagation delay.

In some implementations, process 900 may also involve processor 812 transmitting a feedback having an ACK or a NACK, or both, after receiving a PDSCH by a seventh delay time. In some implementations, process 900 may further involve processor 812 setting a TA of the feedback between UL and DL transmissions as two times the first propagation delay.

In some implementations, process 900 may also involve processor 812 obtaining the second propagation delay using information on a relative location between apparatus 810 and the NTN node based on at least one of the following: (a) positioning information provided by a GNSS, (b) positioning signaling received by apparatus 810 from the TN or the NTN, (c) a prior setting of apparatus 810, (d) an almanac or ephemeris related to the NTN node, and (e) information stored in a component of apparatus 810.

In some implementations, the maximum propagation delay may be determined by at least one of the following: (a) system information received from the NTN node, (b) an almanac or ephemeris related to the NTN node, (c) a value specified in a wireless communication standard, (d) a value derived by apparatus 810, and (e) information stored in a component of apparatus 810.

In some implementations, process 900 may also involve processor 812 obtaining information on a relative location of apparatus 820, as an NT network node, with respect to apparatus 810 based on one or more of: (1) positioning information provided by a GNSS, (2) positioning signaling received by apparatus 810 from the TN or the NTN, (3) a prior setting of apparatus 810, (4) an almanac or ephemeris related to apparatus 820, as the NT network node, and (5) information stored in a component of apparatus 810 (e.g., a U-SIM as a part of or in addition to memory 814).

In some implementations, process 900 may also involve processor 812 obtaining information on the common delay and a maximum propagation delay in a cell in which apparatus 810 is located based on one or more of: (1) system information received by apparatus 810 from the TN or the NTN, (2) an almanac or ephemeris related to apparatus 820, as the NT network node, and (3) information stored in a component of apparatus 810 (e.g., a U-SIM).

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

The invention claimed is:

1. A method, comprising:
    establishing communications with a terrestrial network (TN) node in a TN by a user equipment (UE);
    establishing communications with a non-terrestrial network (NTN) node in an NTN by the UE;
    compensating for a first propagation delay in the communications between the UE and the NTN node by the UE; and
    advancing a preamble transmission by two times a second propagation delay between the UE and the NTN node,
    wherein the UE is able to obtain the second propagation delay,
    wherein the compensating for the first propagation delay is based on at least one of:
        the second propagation delay obtained by the UE; and
        a maximum propagation delay,
    wherein the maximum propagation delay is a first maximum propagation delay of a cell or beam in which the UE is located or a second maximum propagation delay of all cells in coverage of a base station in the NTN.

2. The method of claim 1, further comprising:
    starting a random access response (RAR) receiving window after a preamble transmission by a first delay time plus two times the maximum propagation delay.

3. The method of claim 2, wherein the further comprising:
    indicating a message 3 (MSG3) delay with a value of a second delay time plus two times the maximum propagation delay in the RAR.

4. The method of claim 3, further comprising:
    receiving a message 4 (MSG 4) after transmitting the MSG3 by a third delay time plus two times the maximum propagation delay.

5. The method of claim 3, further comprising:
    setting a timing advance (TA) of the MSG 3 between uplink (UL) and downlink (DL) transmissions as a fourth delay time plus two times the maximum propagation delay.

6. The method of claim 1, further comprising:
    transmitting a physical uplink shared channel (PUSCH) after receiving a downlink control information (DCI) format NO by a fifth delay time.

7. The method of claim 6, further comprising:
    setting a timing advance (TA) of the PUSCH between uplink (UL) and downlink (DL) transmissions as two times the first propagation delay.

8. The method of claim 6, further comprising:
    receiving a feedback having an acknowledgement (ACK) or a negative acknowledgement (NACK), or both, after transmitting the PUSCH by a sixth delay time plus two times the first propagation delay.

9. The method of claim 1, further comprising:
    transmitting a feedback having an acknowledgement (ACK) or a negative acknowledgement (NACK), or both, after receiving a physical downlink shared channel (PDSCH) by a seventh delay time.

10. The method of claim 9, further comprising:
    setting a timing advance (TA) of the feedback between uplink (UL) and downlink (DL) transmissions as two times the first propagation delay.

11. The method of claim 1, wherein the UE obtains the second propagation delay using information on a relative location between the UE and the NTN node based on at least one of:
    positioning information provided by a Global Navigation Satellite System (GNSS),
    positioning signaling received by the UE from the TN or the NTN,
    a prior setting of the UE,
    an almanac or ephemeris related to the NTN node, and
    information stored in a component of the UE.

12. The method of claim 1, wherein the maximum propagation delay is determined by at least one of:
    system information received from the NTN node,
    an almanac or ephemeris related to the NTN node,
    a value specified in a wireless communication standard,
    a value derived by the UE, and
    information stored in a component of the UE.

13. An apparatus implementable in a user equipment (UE), comprising:
    a transceiver; and
    a processor coupled to the transceiver and configured to perform operations comprising:
        establishing, via the transceiver, communications with a terrestrial network (TN) node in a TN;
        establishing, via the transceiver, communications with a non-terrestrial network (NTN) node in an NTN; and
        compensating for a first propagation delay in the communications between the UE and the NTN node by the UE; and
        advancing a preamble transmission by two times a second propagation delay between the UE and the NTN node,
    wherein the processor is configured to obtain the second propagation delay,
    wherein, in compensating for the first propagation delay, the processor is configured to compensate for the first propagation delay based on at least one of:
        the second propagation delay obtained by the UE; and
        a maximum propagation delay, wherein the maximum propagation delay is a first maximum propagation delay of a cell or beam in which the UE is located or a second maximum propagation delay of all cells in coverage of a base station in the NTN.

14. The apparatus of claim 13,
wherein the maximum propagation delay is a first maximum propagation delay of a cell or beam in which the UE is located or a second maximum propagation delay of all cells in coverage of a base station in the NTN, and
wherein the processor is configured to determine the maximum propagation delay based on at least one of:
system information received from the NTN node,
an almanac or ephemeris related to the NTN node,
a value specified in a wireless communication standard,
a value derived by the UE, and
information stored in a component of the UE.

15. The apparatus of claim 14, wherein the processor is further configured to perform operations comprising:
starting a random access response (RAR) receiving window after a preamble transmission by a first delay time plus two times the maximum propagation delay;
indicating a message 3 (MSG3) delay with a value of a second delay time plus two times the maximum propagation delay in the RAR; and
either or both of:
receiving a message 4 (MSG 4) after transmitting the MSG3 by a third delay time plus two times the maximum propagation delay; and
setting a timing advance (TA) of the MSG 3 between uplink (UL) and downlink (DL) transmissions as a fourth delay time plus two times the maximum propagation delay.

16. The apparatus of claim 13, wherein the processor is further configured to perform operations comprising:
transmitting a physical uplink shared channel (PUSCH) after receiving a downlink control information (DCI) format NO by a fifth delay time; and
either or both of:
setting a timing advance (TA) of the PUSCH between uplink (UL) and downlink (DL) transmissions as two times the first propagation delay; and
receiving a feedback having an acknowledgement (ACK) or a negative acknowledgement (NACK), or both, after transmitting the PUSCH by a sixth delay time plus two times the first propagation delay.

17. The apparatus of claim 13, wherein the processor is further configured to perform operations comprising:
transmitting a feedback having an acknowledgement (ACK) or a negative acknowledgement (NACK), or both, after receiving a physical downlink shared channel (PDSCH) by a seventh delay time; and
setting a timing advance (TA) of the feedback between uplink (UL) and downlink (DL) transmissions as two times the first propagation delay.

18. The apparatus of claim 13, wherein the processor is configured to obtain the second propagation delay using information on a relative location between the UE and the NTN node based on at least one of:
positioning information provided by a Global Navigation Satellite System (GNSS),
positioning signaling received by the UE from the TN or the NTN,
a prior setting of the UE,
an almanac or ephemeris related to the NTN node, and
information stored in a component of the UE.

* * * * *